United States Patent [19]
Watanabe et al.

[11] Patent Number: 5,646,747
[45] Date of Patent: Jul. 8, 1997

[54] FILM IMAGE INPUT APPARATUS HAVING CURVED FILM GUIDE MEMBER

[75] Inventors: Shoji Watanabe; Makoto Nakazawa; Sueo Itoh, all of Asaka, Japan

[73] Assignee: Fuji Photo Film Co., Ltd., Kanagawa, Japan

[21] Appl. No.: 424,197

[22] Filed: Apr. 19, 1995

[30] Foreign Application Priority Data

Apr. 25, 1994 [JP] Japan ................ 6-086520

[51] Int. Cl.⁶ .................................. H04N 1/04
[52] U.S. Cl. ............................ 358/487; 358/498
[58] Field of Search .................... 358/474, 487, 358/496, 498; 355/30, 47, 50, 51, 27; H04N 1/04

[56] References Cited

U.S. PATENT DOCUMENTS

| | | |
|---|---|---|
| 5,124,743 | 6/1992 | Shiota . |
| 5,309,242 | 5/1994 | Asami et al. ............... 348/97 |
| 5,343,274 | 8/1994 | Yoshida et al. . |
| 5,382,973 | 1/1995 | Ikari et al. ............... 348/98 |
| 5,461,492 | 10/1995 | Jones ...................... 358/487 |

FOREIGN PATENT DOCUMENTS

| | | | |
|---|---|---|---|
| 5-22656 | 1/1993 | Japan ................ | H04N 5/253 |
| 5-75922 | 3/1993 | Japan ................ | H04N 5/253 |
| WO9004301 | 4/1990 | WIPO ................ | H04N 1/387 |

*Primary Examiner*—Kim Vu
*Attorney, Agent, or Firm*—Sughrue, Mion, Zinn, Macpeak & Seas

[57] ABSTRACT

At the center of a guide plate, another guide plate is provided. A convex curved portion is formed on the guide plate, and a concave curved portion is formed on the guide plate facing the curved portion. The force for straightening a photographic film acts on the curled photographic film when it passes between the curved portions. As a result, the photographic film curled in the cross direction is straightened in a predetermined range. A line sensor reads out an image of a straightening position where photographic film curled in the cross direction has been straightened by the curved portions. As a result, even when the photographic film is fed in such a state that it curls in the cross direction, the straightening position keeps straightened by the function of the curved portions, so that a satisfactory image can be displayed on a monitor TV.

8 Claims, 5 Drawing Sheets

FILM IMAGE INPUT APPARATUS HAVING CURVED FILM GUIDE MEMBER

BACKGROUND OF THE INVENTION

1. Field of the Invention

The present invention relates to a film image input apparatus and more particularly to a film image input apparatus which forms an image of a developed still photographic film on an image sensor through a taking lens and outputs an image signal, which has been photo-electrically transduced by the image sensor, to a monitor TV so as to display the film image on the monitor TV.

2. Description of the Related Art

A film image input apparatus which picks up an image of a developed still photographic film in a continuous form with an image sensor such as a CCD and the like, transduces the image of the photographic film into an image signal, and outputs the image signal to a monitor TV so as to display the film image on the monitor TV is represented by WO90/04301, Japanese Patent Applications Laid-Open No. 5-75922, No. 5-56345, No. 5-22656., and others.

In WO90/04301, there are disclosed a camera and a film image input apparatus wherein the photographic film having a magnetic recording track is used. And, in Japanese Patent Application Laid-Open No. 5-75922, there is disclosed a film image input apparatus using a film cartridge in which a developed still photographic film is wound around a single spool.

And, in No. 5-22656, there is disclosed a film image input apparatus which feeds a developed still photographic film one by one when ordered to make a multiple screen, picks up an image data for each frame through an image sensor, compresses and records the image data for each frame in an image memory for one screen, and displays multiple images on a monitor TV according to the image data stored in the image memory.

SUMMARY OF THE INVENTION

The conventional film image input apparatus has a problem in that its two-dimensional area sensor costs more than a one-dimensional image sensor (a line sensor).

Moreover, a photographic film is wide, easily curls and rigid compared to a magnetic tape such as an audio tape and a video tape, etc. because it is made of an acetate and polyester sheet applied with emulsion. As a result, the conventional film image apparatus has a problem which is explained below. That is, as illustrated in FIG. 6 (A), the still photographic film F curls because it has been wound, and when pulled out, it curls in its cross direction as shown in FIG. 6 (B). Therefore, when the photographic film F is fed with a predetermined tension, the photographic film F is fed in such a state that it curls in an inward direction, so a curved image is read out by the line sensor. As a result, there is a disadvantage in that a distorted image with low resolution is displayed on the monitor TV.

The present invention has been developed in view of the above-described circumstances and has as its aim the provision of a film image input apparatus which can lower the production cost and obtain a satisfactory image without distortion by using the line sensor as an image sensor.

To achieve the above-described object, the present invention comprises film feed means which feeds a developed still photographic film in a continuous form in the longitudinal direction at a fixed speed, a curved guide member which contacts both edges of the photographic film being fed so as to straighten the curled photographic film, a light source which illuminates an image of the straightened photographic film, a line sensor which is provided perpendicular to a feed direction of the photographic film and reads out the image of the straightened photographic film through a taking lens.

According to the present invention, the curved guide member contacts both edges of the developed still photographic films fed by the film feed means so as to straighten the curled photographic film, and the light source illuminates the straightened part and the line sensor reads the straightened part through the taking lens.

Thus, according to the present invention, when the photographic film is fed in such a state that it curls in the inward direction, the curled film is straightened by contacting with the curved guide member, and the image of the photographic film which is kept straightened, is read out by the line sensor, so that the satisfactory image without distortion can be obtained.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures and wherein.

DESCRIPTION OF THE PREFERRED EMBODIMENT

Detailed description will hereunder be given of the preferred embodiment of a film image input apparatus according to the present invention with reference to the accompanying drawings.

Figure 1:
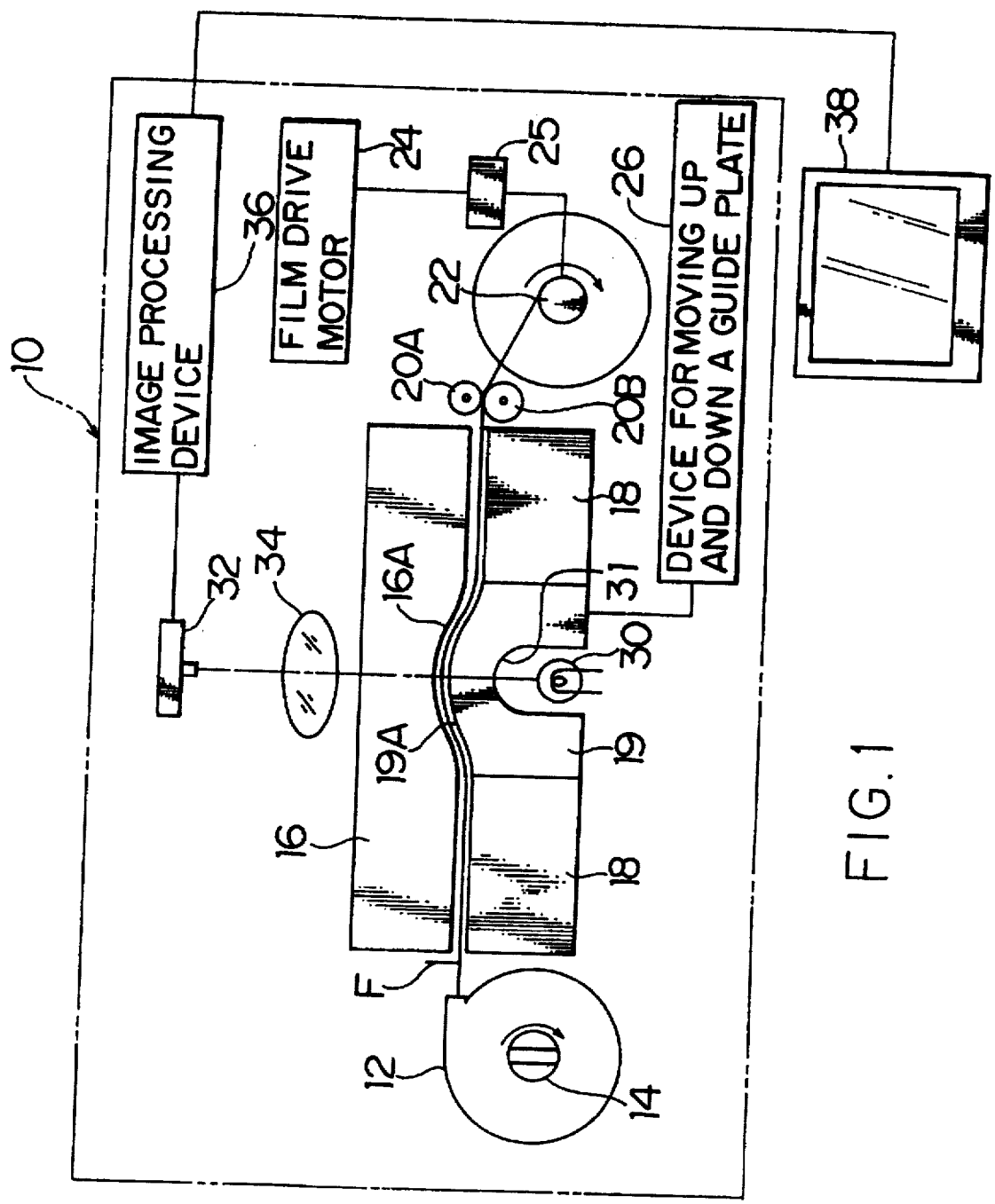
FIG. 1 is a view illustrating the structure of a first embodiment of a film image input apparatus according to the present invention.

FIG. 1 is a view showing the structure of an embodiment of the film image input apparatus according to the present invention.

A film cartridge 12 is mounted in a body 10 of the film image input apparatus, which is shown with a two-dot chain in the drawing. A developed still photographic film F is previously wound around a spool 14, and a forward end of the photographic film F is rewound from the film cartridge 12 by a predetermined amount, and both edges of the photographic film F are guided by the upper and lower guide plates 16 and 18, and a forward end of the photographic film F is engaged with the winding spool 22. The photographic film F is conveyed through between a capstan roller 20A and a pinch roller 20B.

The winding spool 22 is driven and rotated clockwise as shown in the drawing by the driving force of the drive motor 24, which is transmitted via a clutch mechanism 25. As a result, the photographic film F is pulled out from the film cartridge 12, and wound around the winding spool 22 at a fixed speed and with a fixed tension by the function of the capstan roller 20A and the clutch mechanism 25.

Between the guide plates 18, another guide plate 19 is provided. A convex portion 19A is formed on the upper side of the guide plate 19, and a concave curved portion 16A is formed on the lower side of the guide plate 16 facing the convex curved portion 19A. Accordingly, the photographic film F, which has been rewound from the film cartridge 12, is added with the force for straightening it in the longitudinal direction when it passes between the curved portion 16A and the convex portion 19A. As a result, the photographic film F curled in the inward direction is straightened in a range 27 shown with a two-dot chain of FIG. 2.

Figure 3:
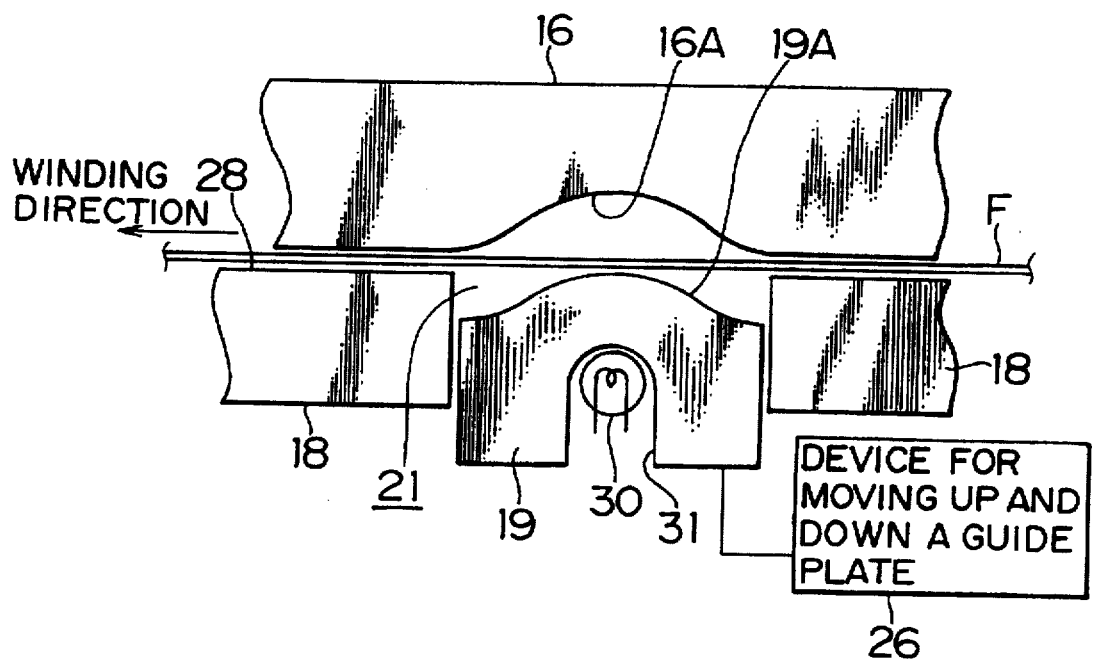
FIG. 3 is an explanatory view illustrating the state that a film guide plate retracts from a film feed position.

And, the guide plate 19 is supported in such a manner that it can move up and down in the vertical direction of FIG. 1, and it moves up and down in the range from the upper limit shown in FIG. 1 to the lower limit shown in FIG. 3 by the driving force of a device 26 for moving up and down a guide plate, which is provided in the body 10. With this arrangement, as shown in FIG. 3, the curved portion 19A of the guide plate 19 can retract from a feed path 28, which is formed by the guide plate 16 and the guide plate 18, toward the lower side.

Figure 2:
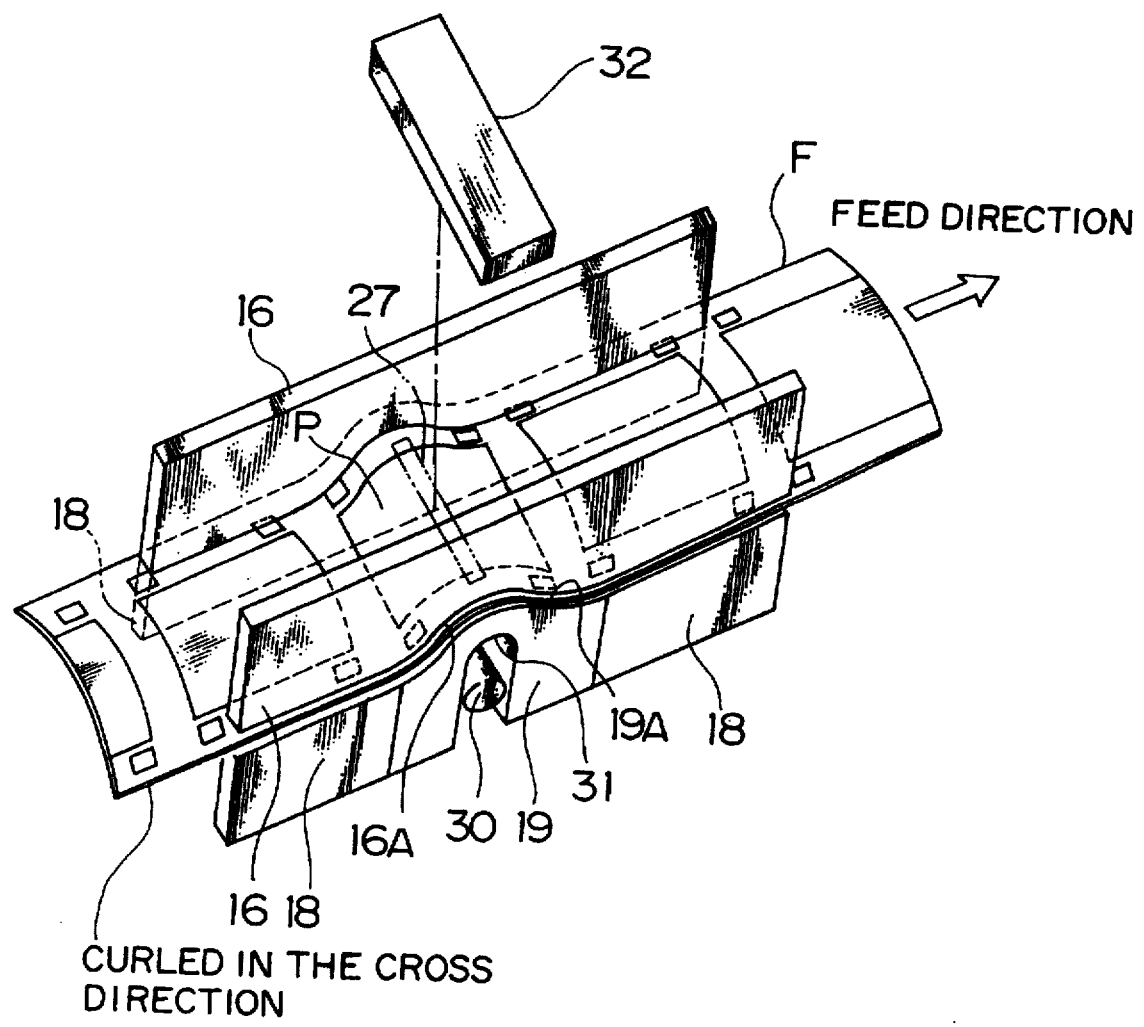
FIG. 2 is a perspective view illustrating the state that a developed still photographic film is being fed.

A fluorescent light is arranged below a straightening position of the photographic film F, that is, the position 27 in the range shown with a two-dot chain in FIG. 2. The fluorescent light 30 is arranged in parallel with the straightening position 27 in a notch 31 formed at the guide plate 19, and illuminates the straightening position 27.

On the other hand, a CCD line sensor 32 is provided above the straightening position 27. the CCD line sensor 32 is arranged perpendicular to the feed direction of the photographic film F, and can read out the image of the photographic film F passing through the straightening position 27 through a taking lens 34. Further, an electric signal transduced by a photo-electric conversion element of the CCD line sensor 32 is processed by an image processing device 36, and then is outputted as a video signal to a monitor TV 38. As a result, the image of the photographic film F can be displayed on the monitor TV 38.

Next, an explanation will be given of the operation of the film image input apparatus constructed in the above-mentioned manner.

First, after the film cartridge 12 is set in the body 10, the forward end of the photographic film F is rewound from the film cartridge 12 by a predetermined amount to engage with the winding spool 22 via the guide plates 16, 18, and a pass roller 20.

Next, the winding spool 22 is rotated by the film drive motor 24, and pulls out the photographic film F at a fixed speed and with a fixed tension. The line sensor 32 reads out the image of the photographic film F, which is illuminated by the fluorescent light 30, through the taking lens 34. At this time, the line sensor 32 reads out the image at the straightening position 27 where the curled photographic film F is straightened by the curved portions 16A and 19A of the guide plates 16 and 19. As a result, in this embodiment, even if the photographic film F is fed in such a state that it curls in its cross direction as shown in FIG. 2, the photographic film F keeps straightened at the position 27 so that the monitor TV 32 can display a satisfactory image without distortion.

Furthermore, in this embodiment, the line sensor 32 reads out the image which keeps straightened, so the taking lens 34 can be used, whose depth of field is small. Therefore, in this embodiment, the cost for the taking lens 34 can be reduced.

In the case that photographic film F is wound around the cartridge 12 or the photographic film F is rapidly traversed or reversed up to a predetermined frame after the line sensor 32 finishes the reading, the guide 19 is previously moved down to a position shown in FIG. 3 by a device 26 for moving up and down a guide plate. Therefore, since the photographic film F is conveyed without resistance from the curved portions 16A and 19A of the guide plates 16 and 19, the photographic film F can be wound with a little driving force.

Figure 4:
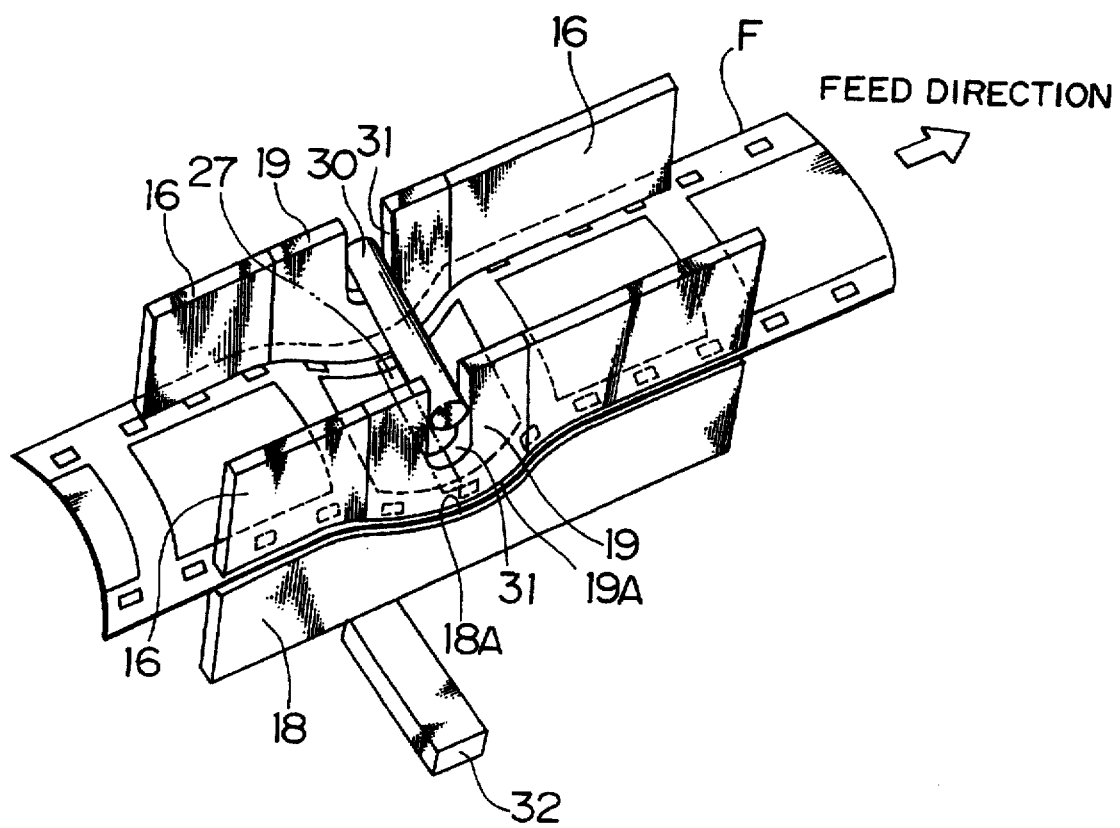
FIG. 4 is a view illustrating the structure of a second embodiment of the film image input apparatus according to the present invention.

FIG. 4 is a perspective view illustrating the second embodiment of the film image input apparatus according to the present invention. The same marks are put on the same or similar parts as those of the first embodiment shown in FIGS. 1-3.

In the film image input apparatus shown in FIG. 4, the guide plate 19 is arranged at the guide plate 16 located at the upper side in such a manner that the guide 19 can move up and down. And, a concave curved surface 18A is formed at a lower guide plate 18, which corresponds to the convex curved portion 19A of the guide plate 19, and the curled photographic film F is straightened by the curved portion 19A and the carved portion 18A. And, in the film image input apparatus shown in FIG. 4, the fluorescent light 30 is arranged above the photographic film F, and the line sensor 32 is arranged below the photographic film F.

Figure 5:
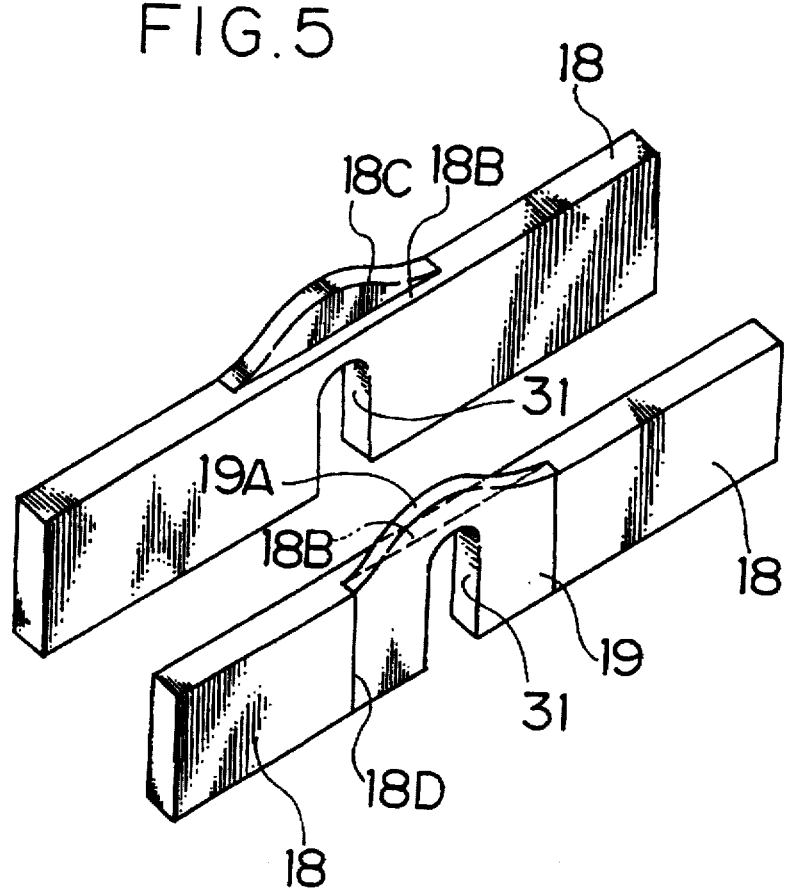
FIG. 5 is a view illustrating the structure of a third embodiment of the film image input apparatus according to the present invention; and, FIG. 6 (A) is an explanatory view illustrating the curling developed still-photographic film, and FIG. 6 (B) is an explanatory view illustrating the developed still photographic film curled in the inward direction because it has been pulled out.
Figure 6A:
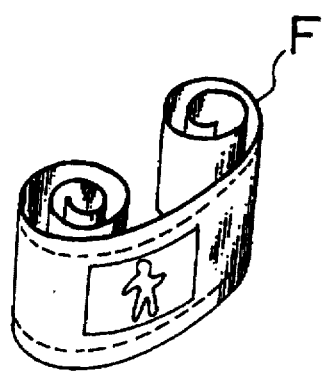
Figure 6B:
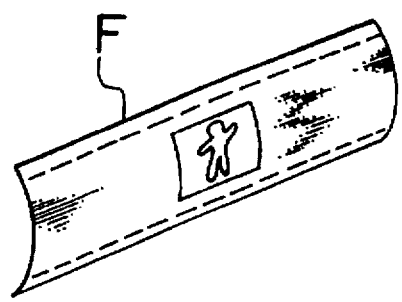

FIG. 5 is a perspective view illustrating the third embodiment of the film image input apparatus according to the present invention. The same marks are put on the same or similar parts as those of the first embodiment shown in FIGS. 1-3.

In the film image input apparatus shown in FIG. 5, a convex curved portion 18C, which corresponds to the carved portion 19A of the guide plate 19, is formed on an upper surface 18B of one of the guide plates 18. And, at the other guide plate 18, a groove 18D is formed at a position opposite to the convex curved portion 18C, and the guide 19 is arranged in the groove 18D in such a manner that it can freely ascend and descend. When the guide plate 19 is moved up by a device for moving up and down a guide plate, the convex curved portion 19A projects from the top surface 18B of the guide plate 18, and when the guide plate 19 is moved down by the device for moving up and down the guide plate, the convex curved portion 19A is positioned at a lower position where it does not project from the top surface of the guide plate 18. According to the film image input apparatus shown in FIG. 5, even when the guide plate 19 moves down, the convex curved portion 19A is positioned at the lower position and then the photographic film F is rapidly traversed and reversed, the photographic film F is always guided by a top surface 18B of the guide plate 18, so that it can prevent the forward end of the photographic film F from being wound into the portion between the guide plate 18 and the guide plate 18 as shown in FIG. 3.

As has been described above, according to the film image input apparatus of the present invention, the curved guide plate contacts the developed still photographic film to straighten the curled photographic film F and the line sensor reads out the image of the photographic film F which keeps straightened, so that the satisfactory image without distortion can be obtained.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film image input apparatus comprising:

film feed means which feeds a developed still photographic film in a continuous form in a longitudinal direction;

curved guide means for contacting said photographic film being fed and straightening said photographic film curling in a cross direction by curving said photographic film in a longitudinal direction;

a light source for illuminating an image of said photographic film which has been straightened by said guide means; and, image pickup means provided opposite to said light source across said fed photographic film, for reading out the image of said photographic film through a taking lens.

2. The film image input apparatus according to claim 1, wherein said image pickup means is a line sensor which is arranged perpendicular to a feed direction of said photographic film.

3. The film image input apparatus according to claim 1, wherein said curved guide means has a contact section contacting at least both edges of said photographic film, said contact section being curved.

4. The film image input apparatus according to claim 1, wherein said curved guide means is provided in a manner to move forward into and backward from a feed path of said photographic film, contacts the photographic film being fed when moving forward, and then straightens the photographic film curled in the cross direction.

5. The film image input apparatus according to claim 4, wherein said curved guide means moves forward into and backward from the feed path of said photographic film by a drive device.

6. The film image input apparatus according to claim 5, said drive device controls said curved guide means so that said guide means moves forward into the feed path of said photographic film when the image of said photographic film is read out.

7. The film image input apparatus according to claim 1, wherein said curved guide means is a part of a feed guide plate forming the feed path of said photographic film.

8. The film image input apparatus according to claim 2, wherein said light source is a fluorescent light which is arranged perpendicular to the feed direction of said photographic film.

* * * * *